United States Patent [19]
Roybal

[11] Patent Number: 5,719,932
[45] Date of Patent: Feb. 17, 1998

[54] SIGNAL-RECOGNITION ARRANGEMENT USING CADENCE TABLES

[75] Inventor: Larry John Roybal, Westminster, Colo.

[73] Assignee: Lucent Technologies Inc., Murray Hill, N.J.

[21] Appl. No.: 589,233

[22] Filed: Jan. 22, 1996

[51] Int. Cl.⁶ .................................................. H04M 1/00
[52] U.S. Cl. ......................... 379/386; 379/373; 379/375
[58] Field of Search ............................ 379/350, 386, 379/286, 377, 375, 373, 100, 372; 340/825.64, 825.65, 825.62

[56] References Cited

U.S. PATENT DOCUMENTS

| | | | |
|---|---|---|---|
| 4,696,031 | 9/1987 | Freudberg et al. | 379/386 |
| 5,063,593 | 11/1991 | Kwon | 379/377 |
| 5,416,836 | 5/1995 | Marinelli et al. | 379/377 |
| 5,521,967 | 5/1996 | Novas et al. | 379/100 |

OTHER PUBLICATIONS

"Knock–Knock, Who's There?", Computer Telephony 85, Nov. 1995.

*Primary Examiner*—Jack Chiang
*Attorney, Agent, or Firm*—David Volejnicek

[57] ABSTRACT

A call classifier (300, 500) for recognizing cadenced signals (100–103) is based on data tables (110, 111) whose contents define the cadences of the signals that need to be recognized. Consequently, the call classifier may be adapted for recognizing the cadenced signals of various signaling schemes that are used in various countries or telecommunication systems, simply by reprogramming the data contents of the data tables. Each cadenced signal comprises a different pattern of interleaved signal-on (P) intervals and signal-off (S) intervals. A separate cadence timing table-pair (200–204) corresponds to each sequential S/P interval-pair. Each table-pair includes a P table (210) and an S table (211) each having a plurality of entries (220, 221) each corresponding to a different duration of the corresponding P interval and S interval, respectively, and identifying those signals which have the corresponding P interval and S interval duration, respectively, as candidates for a received signal. The durations of sequential ones of the P and S intervals of the cadence pattern of the received signal are measured (303, 304) and applied (305, 306) as pointers to sequential ones of the cadence timing table-pairs to select the corresponding table entries. The selected table entries are ANDed (307) with each other until only one candidate remains in the result (308). The one candidate identifies the received signal. Because reception of a signal can begin anywhere within the signal's cadence pattern, the table-pairs are initially used (500) to identify when the end of one and the beginning of another instance of the cadence pattern has been received.

16 Claims, 7 Drawing Sheets

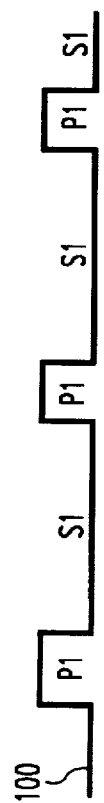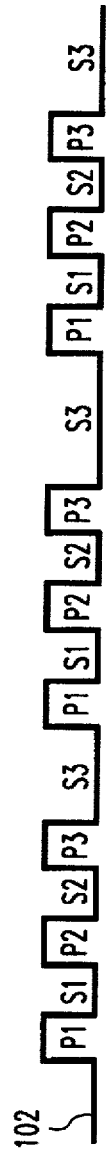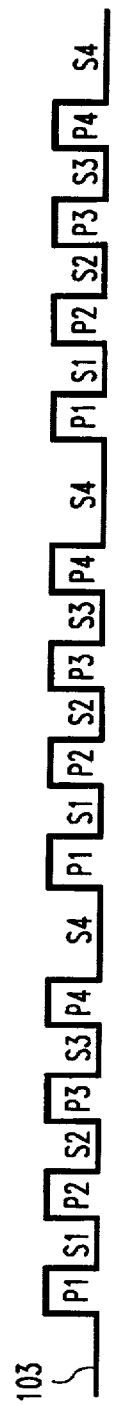
FIG. 1A
FIG. 1B
FIG. 1C
FIG. 1D

FIG. 7

CADENCE COUNT TABLE 508

| | S/P COUNT |
|---|---|
| SIGNAL 1 | ← 517 |
| ⋮ | ⋮ |
| SIGNAL X | ← 517 |

SIGNAL-RECOGNITION ARRANGEMENT USING CADENCE TABLES

TECHNICAL FIELD

This invention relates generally to telecommunications systems, and relates specifically to detection and recognition of control signals in such systems.

BACKGROUND OF THE INVENTION

Telecommunications systems, such as telephone systems, use signals to communicate control information between their various parts. Therefore, the receiving equipment must have signal-recognition facilities—called "call classifiers"—for detecting and recognizing the various signals. Conventionally, many of these signals have been cadenced signals: a pattern of signal-energy on and signal-energy off periods, wherein the pattern may be repeating or non-repeating. Examples thereof are the ringing tone and the busy tone in typical telephone systems.

The signal-recognition facilities for cadenced signals have conventionally used a state machine for signal recognition. The state machine has typically been very complex, involving large numbers of states even for signaling schemes that use simple cadences, and has been individually designed for recognizing the signals used in each particular telecommunications system or country. Such a state machine is difficult and expensive to design, implement, modify, or adapt to a different signaling scheme.

With the globalization of the telecommunications markets, it has become important for telecommunications equipment to be easily configurable for service in many different countries and their telecommunications systems. However, the conventional state-machine-based signal recognition facilities are an impediment to this objective. Moreover, many countries employ signaling schemes with very complex cadences which make their recognition via state machines impractical.

SUMMARY OF THE INVENTION

This invention is directed to solving these and other problems and disadvantages of the prior art. Generally according to the invention, there is provided a signal-recognition arrangement that is based on data tables whose contents define the cadences of signals that need to be recognized, and that is adaptable for recognizing the cadenced signals of whatever signaling scheme is used in any particular country or telecommunications system, by the simple expedient of changing the data contents of the data tables.

The table-based signal-recognition arrangement receives cadenced signals. As was mentioned previously, a cadenced signal comprises a cadence—a pattern—of interleaved signal-on intervals and signal-off intervals. Each first table of a sequence of a plurality of first tables corresponds to a different signal-on interval in the cadence and has a plurality of entries. Each entry corresponds to a different duration of the corresponding signal-on interval and identifies those signals that have the corresponding signal-on interval duration, as candidates for the received signal. Similarly, each second table of a sequence of a plurality of second tables corresponds to a different signal-off interval in the cadence and has a plurality of entries. Each entry corresponds to a different duration of the corresponding signal-off interval and identifies those signals that have the corresponding signal-off interval duration, as candidates for the received signal. The durations of sequential ones of the signal-on and signal-off intervals of a received cadenced signal are measured and the sequential measured durations are used, e.g., as addresses or pointers into the tables, to select the corresponding entries from sequential ones of the first and second tables, respectively. The entries that are selected from the first and the second tables are compared—for example, by being ANDed—to determine a single signal that is identified by each of the selected entries as a candidate for the received signal. The single candidate is then indicated to be the received signal.

The table-based signal-recognition arrangement avoids the complexity of state-machine-based call classifiers. It also avoids their lack of flexibility: to change the cadenced signals that are sought to be recognized, only the data contents of the tables need to be changed, and not the structure of the arrangement itself. Consequently, the table-based signal recognition arrangement is generally simpler and less expensive to implement as well as to adapt to different signaling schemes.

The arrangement as characterized above assumes that the cadenced signal is received starting at the beginning of its cadence. But that may not always be the case, and reception of the signal may begin anywhere within the signal's cadence. Therefore, the arrangement preferably includes a facility for identifying the beginning of a cadence of the received signal—that is, a facility for identifying the end of reception of one instance, and hence the beginning of reception of another instance, of a repeating cadence pattern. Preferably, this facility also uses the first and second tables to identify the beginning of the cadence.

These and other advantages and features of the invention will become more apparent from the following description of an illustrative embodiment of the invention, taken together with the drawing.

BRIEF DESCRIPTION OF THE DRAWING

FIGS. 1A–1D are diagrams of cadences of four illustrative cadenced signals;

FIG. 7 is a block diagram of a cadence count table of the signal-recognition engine of FIG. 5.

DETAILED DESCRIPTION

FIGS. 1A–1D show the cadences of four illustrative signals 100–103. As shown in FIG. 1, cadence of a signal consists of a pattern of energy-ON periods and energy-OFF periods, which pattern may or may not repeat. The ON periods are depicted by a measurement P(n) and the OFF periods are depicted by a measurement S(n) where n=1, 2 . . . N. Each measurement P(n) and S(n) is either a time of duration or a count representative of the time of duration. A cadence consists of a minimum of one P/S pair. A repeating cadence consists of the number of P/S pairs that make up the repeating pattern. A non-repeating cadence consists of an infinite number of P/S pairs.

Because real-world signals can vary within some predetermined tolerance, each P(n) and S(n) can have a range of values—for example, ±10% of the normal value. That is, for each P(n) and S(n) to be considered a valid part of a cadence, its value must fall within the specified range of values.

Figure 2:
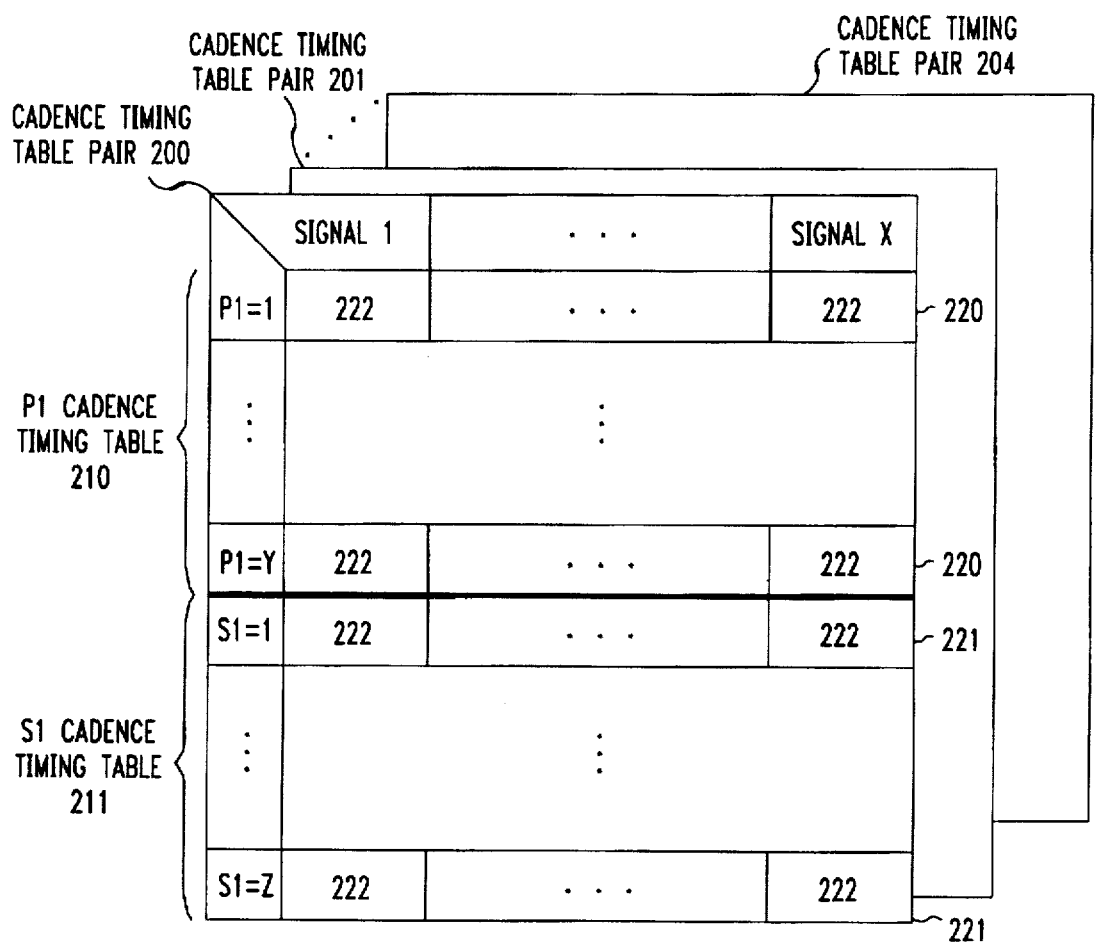
FIG. 2 is a block diagram of cadence timing table-pairs constructed according to the invention.

The signals that are sought to be recognized are defined by their cadences via cadence timing table-pairs 200–204 shown in FIG. 2. There are as many cadence timing table-pairs as the maximum number of P/S pairs that are needed to uniquely characterize the cadence of every signal that is sought to be detected. Each cadence timing table-pair 200–204 corresponds to a different value of (n): table-pair 200 corresponds to the P1/S1 pair;, table-pair 201 corresponds to the P2/S2 pair;, etc.; and table-pair 204 corresponds to the P(N)/S(N) pair.

Each cadence timing table-pair 200–204 consists of two tables 210, 211. Tables 210 define P(n) timing characteristics of the signals that are sought to be recognized, and are referred to as the P(n) cadence-timing tables, while tables 211 define S(n) timing characteristics, and are referred to as the S(n) cadence-timing tables. Each table 210, 211 contains a plurality of entries 220, 221, respectively. Entries 220, 221 are addressed by the values of the corresponding P(n) and S(n) measurements, respectively. That is, the measured values of P(n) and S(n) function as pointers into tables 210, 211. Each entry 220, 221 has a plurality of one-bit fields 222, one for each signal that is sought to be recognized. If the value of P(n) or S(n) that points to the corresponding entry 220, 221 characterizes the signal that corresponds to the field 222, its bit is set; otherwise it is not set. Hence, fields 222 whose bits are set in an entry 220, 221 identify those signals that are candidates for being the particular signal whose measured P(n) or S(n) value points to this entry 220, 221.

To define the signals that are sought to be detected, a system administrator populates cadence timing table-pairs 200–204 with the data that define those signals, by setting the appropriate bits of entries 220 and 221. To change the signals that are sought to be detected, the system administrator changes the data contents of table-pairs 200–204. Consequently, the table-pairs 200–204 can be easily adapted for use with substantially any cadenced-signal signaling scheme.

As was mentioned above, real-world signals can vary within some predetermined tolerance range. This is reflected in table-pairs 200–204 by having adjacent entries 210 and 211 that span the allowable range of P(n) and S(n) values of an individual signal all identifying that signal as a candidate.

Figure 3:
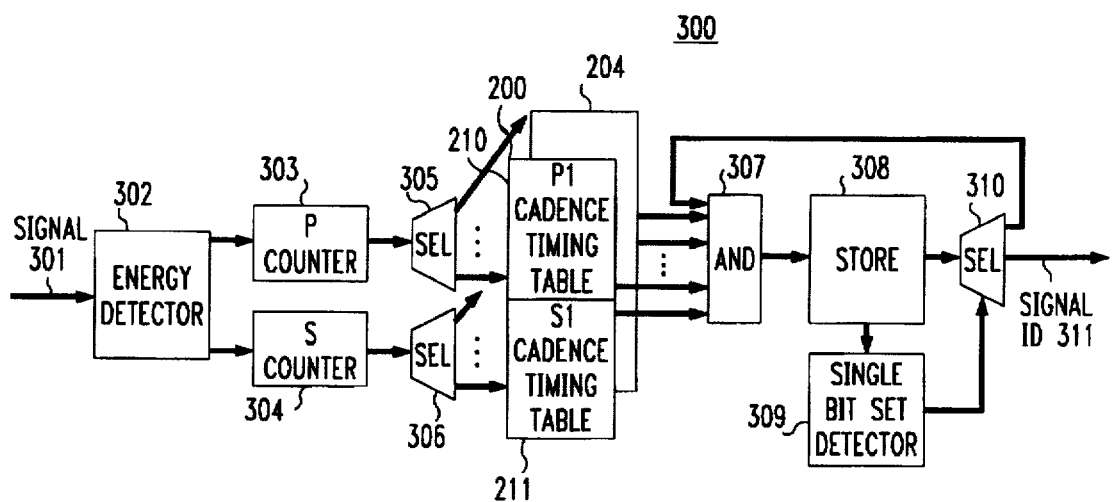
FIG. 3 is a block diagram of a signal-recognition engine that embodies a first illustrative example of the invention.

FIG. 3 shows a functional block representation of a signal-recognition engine 300 that is based on the cadence timing tables of FIG. 2. While engine 300 may be implemented in hardware, a preferred implementation is in software, via a program that executes on a processor—for example, on the control processor of a switching system such as a stored-program-controlled private branch exchange (PBX). The operation of engine 300 is flowcharted in FIG. 4.

Signals that are sought to be detected arrive at engine 300 via an input signal line 301 and enter an energy detector 302. Energy detector 302 monitors signal line 301 for presence and absence of signal energy. When energy detector 302 detects signal energy on signal line 301, it resets and starts a P counter 303. P counter 303 then times the duration of the first signal-on period (P1), at step 400 of FIG. 4. When energy detector 302 ceases to detect signal energy on signal line 301, it stops P counter 303 and resets and starts S counter 304. S counter 304 then times the duration of the first signal-off period (S1), at step 402 of FIG. 4. When energy detector 302 again detects signal energy on signal line 301, it stops S counter 304 and again resets and starts P counter 303. P counter 303 then times the duration of the second signal-on period (P2), at step 404. When energy detector 302 again ceases to detect signal energy on signal line 301, it again stops P counter 303 and again resets and starts S counter 304. S counter 304 then times the duration of the second signal-off period (S2), at step 406. This procedure is repeated for the P3/S3 pair, etc., until the received signal is recognized and the operation of engine 300 ends, at step 450.

P and S counters 303 and 304 are respectively connected by selectors 305, 306 to P cadence timing tables 210 and S cadence timing tables 210 of table-pairs 200–204. When energy detector 302 stops P counter 303 for the first time, selector 305 connects the count of P counter 303 as the measured P1 value to P1 cadence timing table 210 of table-pair 200; when energy detector 302 stops P counter 303 for the second time, selector 305 connects the count of P counter 303 as the measured P2 value to P2 cadence timing table 210 of cadence timing table-pair 201; etc. Similarly, when energy detector 302 stops S counter 304 for the first time, selector 306 connects the count of S counter 304 as the measured S1 value to S1 cadence timing table 211 of table-pair 200; when energy detector 302 stops S counter 304 for the second time, selector 306 connects the count of S counter 304 as the measured S2 value to S2 cadence timing table 211 of cadence timing table-pair 201; etc.

In table-pair 200, the P1 value is used as a pointer to select an entry 220 of P1 cadence timing table 210, at step 420, and the S1 value is used as a pointer to select an entry 221 of S1 cadence timing table 211, at step 422. These two selected entries are ANDed with each other by an AND function 307, at step 424, and the result is stored in a store 308. The result is a candidate list that identifies the signals which are candidates for being the signal that is being received on signal line 301. A single-bit-set detector 309 analyzes the contents of store 308 to determine whether only one bit is set in store 308, at step 426. If only one bit is set in store 308, the signal incoming on signal line 301 has been uniquely identified, at step 448, and single-bit-set detector causes a selector 310 to output the contents of store 308 as the identifier of the recognized signal at a signal ID output 311. The signal-recognition engine of FIG. 3 then ends its operation, at step 450.

If it is determined at step 426 that more than one bit is set in store 308, the incoming signal has not yet been uniquely identified, and detector 309 causes selector 310 to provide the contents of store 308 as an input to AND function 37. Meanwhile, the measured P2 value is used as a pointer to select an entry 220 of P2 cadence timing table 210 of the next sequential cadence timing table-pair 201 in the sequence of table-pairs 200–204, at step 430, and the S2 value is used as a pointer to select an entry 221 of S2 cadence timing table 211 of that same one table-pair 201, at step 432. These two selected entries 220, 221 of table-pair 201 are ANDed with each other and with the contents of store 308 by AND function 307, at step 434, and the result is again stored in store 308. Detector 309 again analyzes the contents of store 308 to ascertain whether only one bit is set in store 308, at step 436. If only one bit is set in store 308 the signal incoming on signal line 301 has been uniquely identified, at step 448, and detector 309 causes selector 310 to output the contents of store 308 at the signal ID output 311. The operation of signal-recognition engine 300 then ends, at step 450. If more than one bit is set in store 308, the procedure described above for the P2/S2 pair is analogously repeated for the P3/S3 pair, and so on, until the incoming signal is uniquely recognized.

If detector 309 ever determines that no bits are set in store 308, the incoming signal cannot be recognized, and detector 309 generates an indication to that effect.

Figure 5:
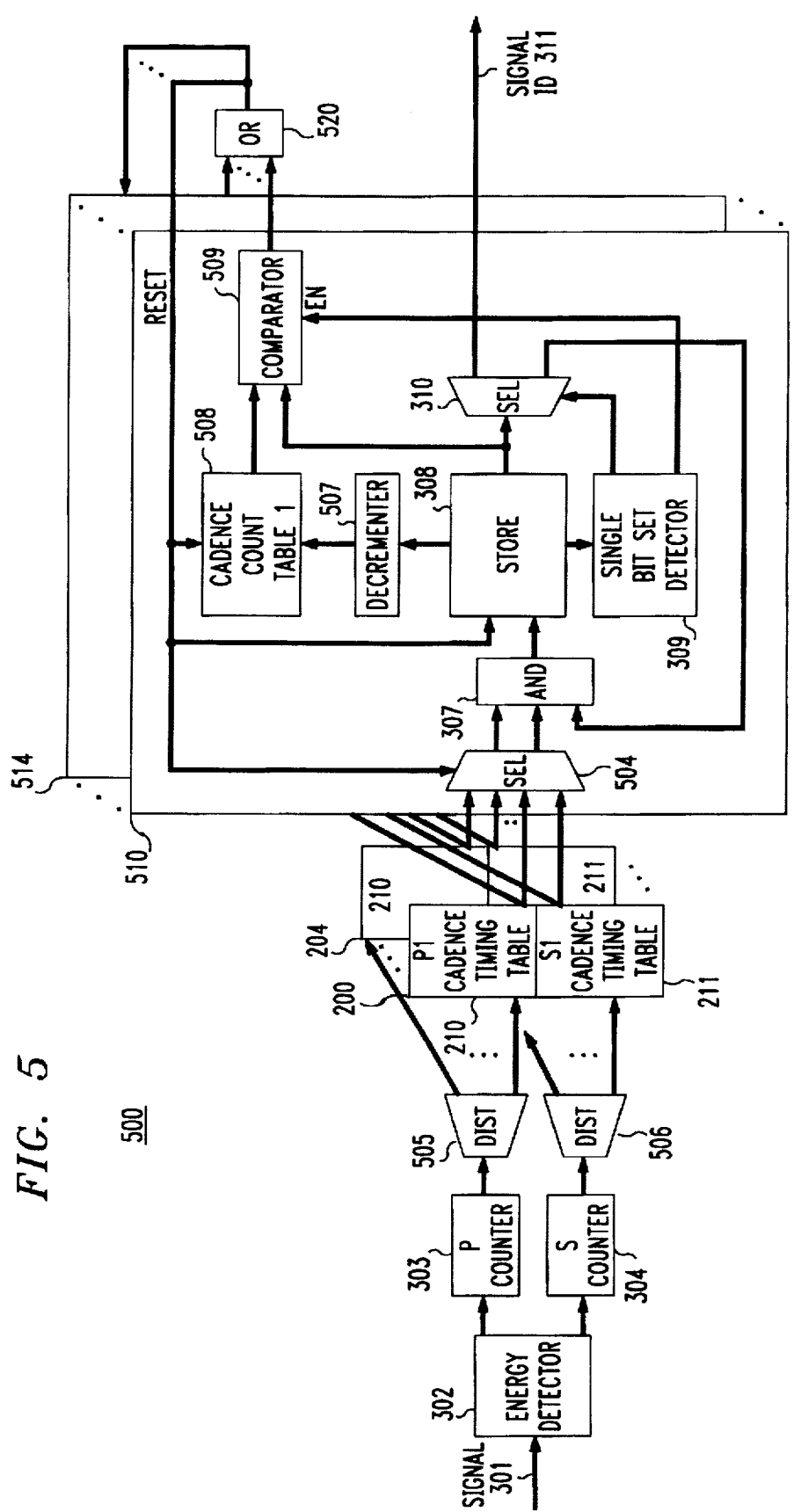
FIG. 5 is a flow diagram of a signal-recognition engine that embodies a second illustrative example of the invention.
Figure 6A:
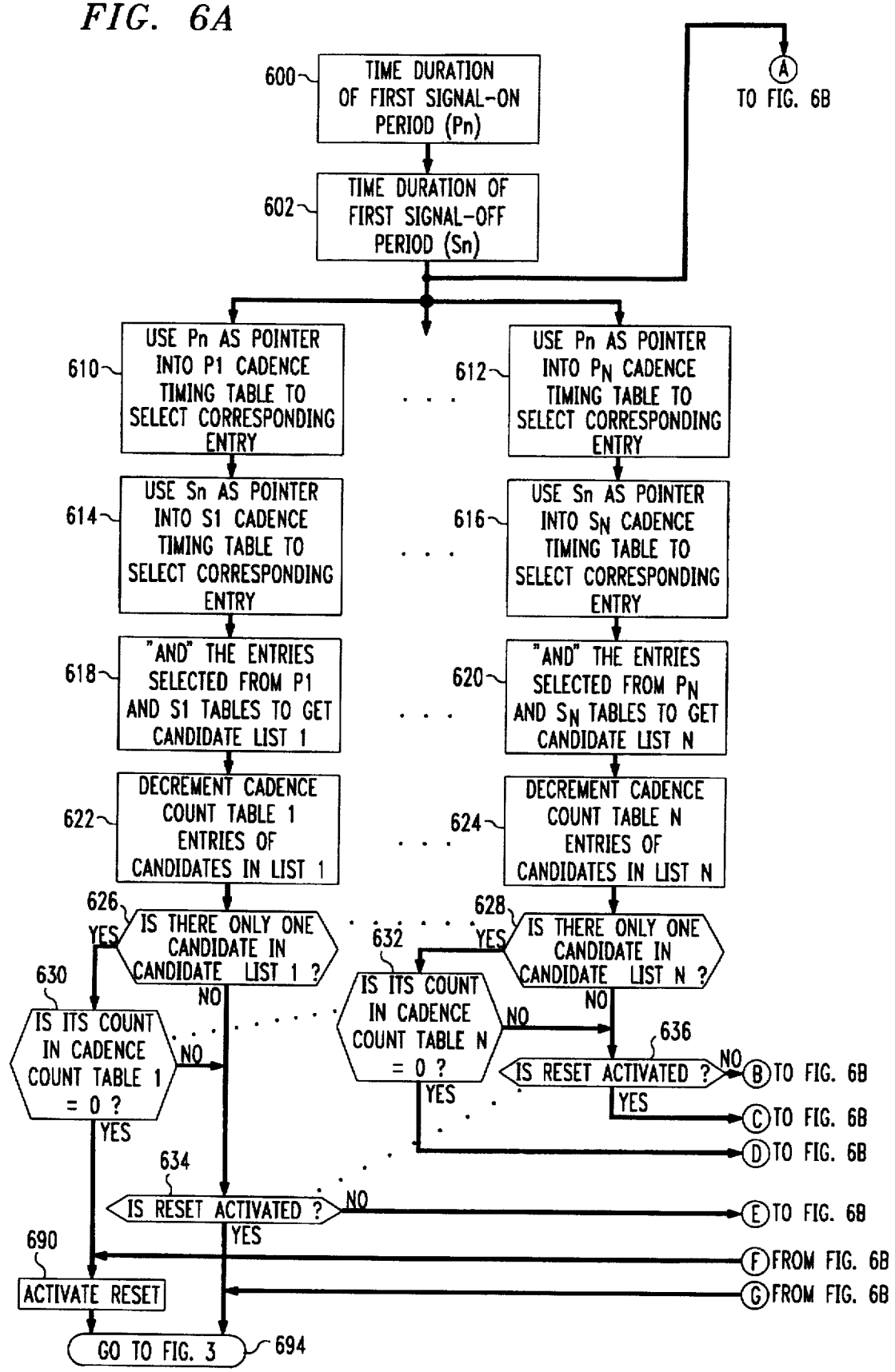
FIGS. 6a and 6b are flow diagrams of the operation of the signal-recognition engine of FIG. 5.
Figure 6B:
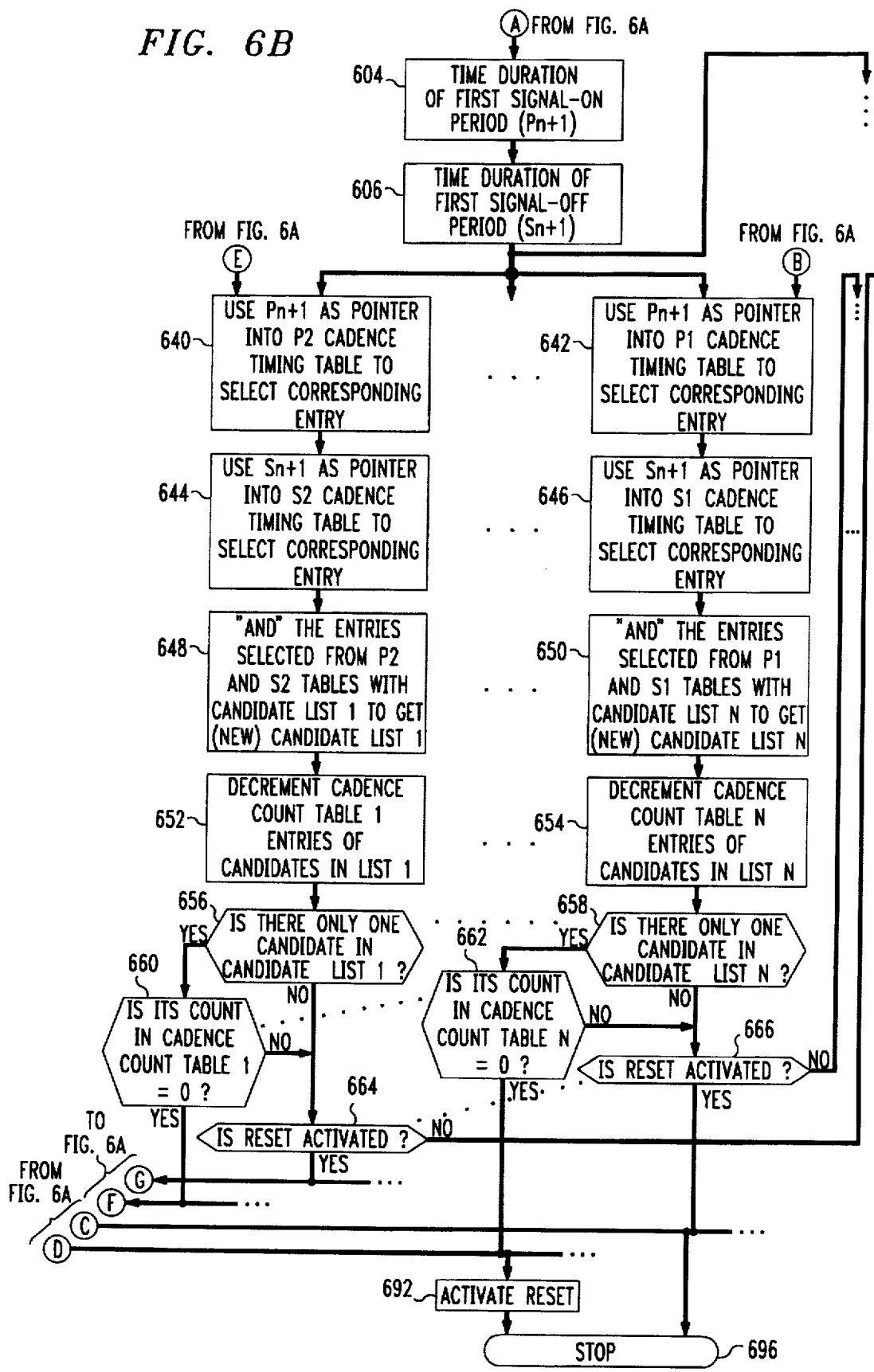

The above discussion has been greatly simplified by the assumption that a signal received on signal line 301 is always received from its beginning, that is, starting with the beginning of its cadence—with its P1/S1 pair. In the real world, that is not always the case, however: a signal may start being received at any point within its cadence—for example, the P3/S3 pair of a signal may be the first P/S pair received. For proper signal recognition, its is necessary to start the signal-recognition process with the signal origin, i.e, with the P1/S1 pair. Consequently, the structure and operation of signal-recognition engine 300 of FIG. 3 is made more complex by the need to include therein facilities for detection of the signal origin. Such a signal-recognition engine 500 is shown in FIG. 5. Elements thereof which are the same as those of signal-recognition engine 300 are designated with the same numerals as in FIG. 3. The operation of engine 500 is flowcharted in FIGS. 6A–6B.

Figure 4:
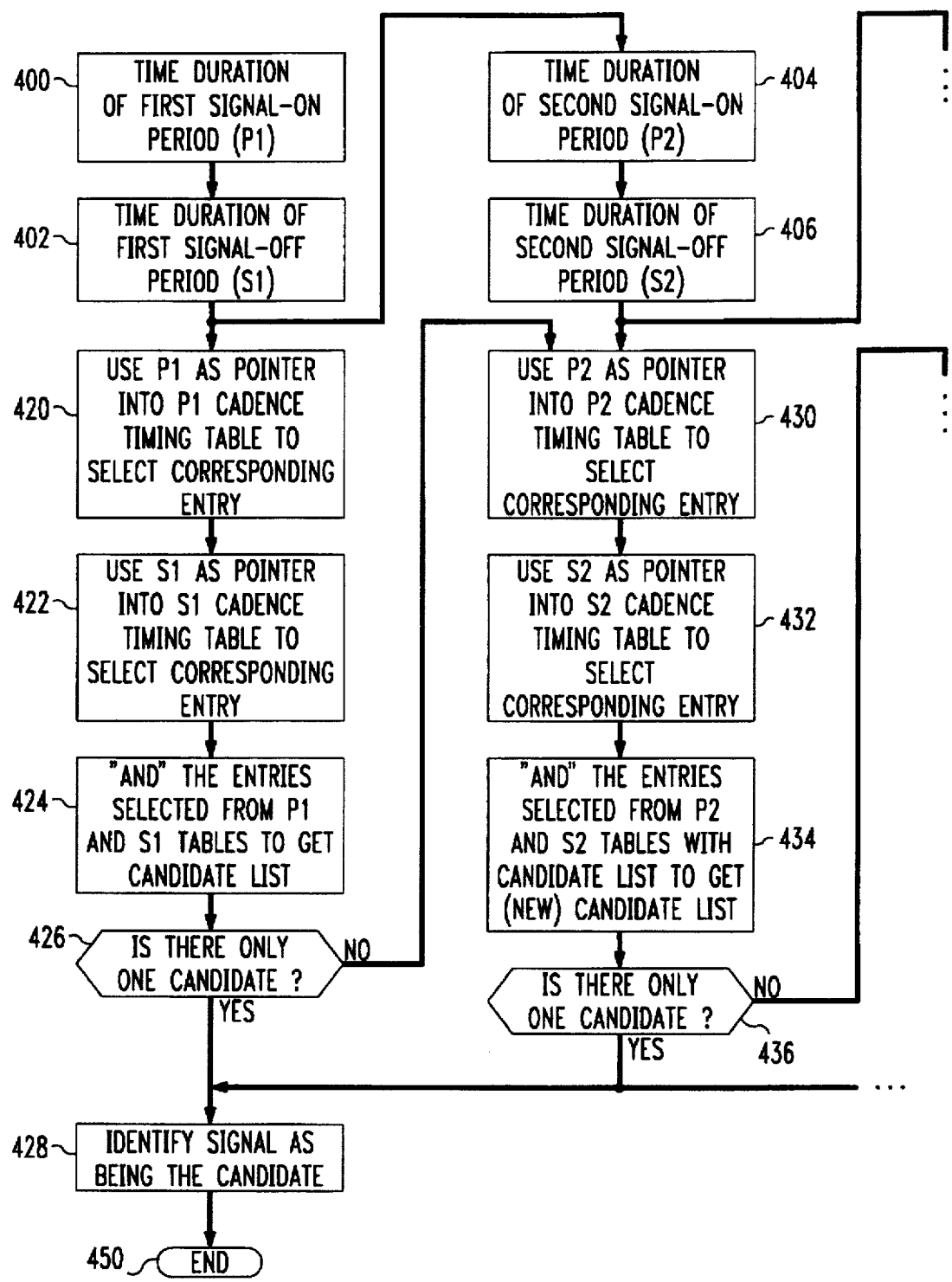
FIG. 4 is a flow diagram of the operation of the signal-recognition engine of FIG. 3.

Signal-recognition engine 500 includes signal line 301, energy detector 302, P counter 303, and S counter 304, inter-connected in the same way as in FIG. 3, as shown in FIG. 5, and operating in the same way as described in conjunction with FIG. 4, as shown at steps 602–606 of FIG. 6. However, it is not known at this time which P(n)/S(n) pair is being measured by counters 303 and 304. Selectors 305 and 306 are therefore replaced by distributors 505 and 506 which connect each measured P(n) value to P cadence timing tables 210 of all table-pairs 200–204 and which connect each measured S(n) value to S cadence timing tables 210 of all table-pairs 200–204.

In each table-pair 200–204, the first P(n) value is used as a pointer to select an entry 220 of P cadence timing table 210, at steps 610–612, and the first S(n) value is used as a pointer to select an entry 221 of S cadence timing table 211, at steps 614–616. Engine 500 includes a plurality of pattern-origin-detection facilities 510–514, which are replicas of each other, for processing the entries selected from table pairs 200–204. There are as many facilities 510–514 as there are table-pairs 200–204. Each facility 510–514 has access at any one time to the two selected entries 220, 221 from a different table-pair 200–204. A selector 504 of each facility 510–514 selects the two entries 220, 221 from a different one of table-pairs 200–204: selector 504 of facility 510 initially selects entries 220, 221 from table-pair 200, selector 504 of the next facility initially selects entries 220, 221 from table-pair 201, etc., and selector 504 of facility 514 initially selects entries 220, 221 from table-pair 204. (Each facility 510–514 is here said to correspond to the one pair of entries 220, 221 selected by the initial, (P(1)/S(1), pair that is initially selected by its selector 504.) The two selected entries 220, 221 are ANDed with each other in each facility 510–514 by AND function 307 and the result in each facility 510–514 is stored in a store 308, at steps 618–620. The results that are stored in stores 308 of facilities 510–514 are candidate lists that identify the signals which are candidates for being the signal received on signal line 301.

Each facility 510–514 has its own cadence count table 508. As shown in FIG. 7, each table 508 has an entry 517, for each signal that is sought to be recognized. Each signal's entry 517 initially indicates the number of S/P pairs that are needed to uniquely identify that signal; the initial contents of all tables 508 are identical. A decrementer 507 in each facility 510–514 decrements entries 517 in cadence count table 508 of those signals whose corresponding bits are set in store 308, at steps 522–624. In each facility 510–514, single-bit-set detector 309 analyzes the contents of store 308 to determine whether only one bit is set in store 308, at steps 626–628. If only one bit is set in store 308, detector 309 enables a comparator 509 to compare the contents of store 308 and cadence count table 508 in order to determine whether the decremented count in cadence count table 508 for the signal whose bit is set in store 308 is zero, at steps 630–632. If the signal's count is zero, the end of one cadence—and hence the beginning of the next cadence—of a signal has been identified by this facility. The results of the determinations of comparators 509 of all facilities 510–514 are ORed by an OR function 520 whose output acts as a reset signal for all facilities 510–514 of engine 500, at steps 690–692. Hence, if any facility 510–514 has identified the beginning of a cadence pattern, as determined at steps 634–636, all facilities 510–514 are reinitialized to their starting state. All facilities other than facility 510 then cease their operation, at step 694, and engine 500 with only facility 510 in operation now proceeds to perform the operations of FIG. 3 to recognize the signal, at step 696.

If detector 309 determines that more than one bit is set in store 308, at steps 626–628, or if comparator 509 determines that the one candidate signal's count in cadence count table 508 is not zero, at steps 630–632, the end of one cadence and the beginning of the next cadence of a signal has not been identified by the corresponding facility 510–514. If none of the other facilities also identify the end of one and the beginning of the next cadence of a signal, as determined at steps 634–636, detector 309 of each facility 510–514 causes selector 310 to provide the contents of store 308 as an input to AND function 307.

Meanwhile, the next measured P value, P(n+1), is used as a pointer to an entry 220 of P cadence timing table 210 of each timing table-pair 200–204, at steps 640–642, and the next measured S value, S(n+1), is used as a pointer to an entry 221 of S cadence timing table 211 of each cadence timing table-pair 200–204, at steps 646–646, again resulting in selection of a pair of entries 220, 221, from each table 200–204. However, selector 504 of each facility 510–514 now selects the entries 220, 221 from the next sequential table-pair 200–204 relative to the previously-selected entries' table-pair. Thus, for example, selector 504 of facility 510 selects entries 220, 221 from table-pair 201, selector 504 of facility 511 selects entries 220, 221 from table-pair 202, etc., and selector 504 of the last facility 514, which previously selected entries 220, 221 from table-pair 204, "wraps around" and selects entries 220, 221 from table-pair 200. In each facility 510–514, the selected entries 220, 221 are ANDed by AND function 307 with the contents of store 308, and the result is stored in store 308, at step 648–650. The rest of the operation of each facility 510–514 is the same as was described above for steps 622–636, at steps 652–666. The above-described operation of engine 500 is repeated for each P/S pair until one of the facilities 510–514 detects the beginning of a cadence. As was already mentioned above, at that point, engine 500 is reset, the operation of facilities 510–514 other than facility 510 stops, at step 694, and engine 500 with only facility 510 operating proceeds to perform the functions of FIG. 3, at step 696.

Of course, various changes and modifications to the illustrative embodiment described above will be apparent to those skilled in the art. For example, the signal-recognition engine may be implemented in a field programable gate array. The resulting speed increase could yield more ports of classification on a single board, and thereby yield greater performance per unit of cost. Or, noise immunity may easily be built into the signal recognition engine simply by taking the duration (i.e., the combined counts of the S and P counters) of any S/P or P/S pair that results in the selection of two empty entries (i.e., no candidate signals) from the cadence timing tables, and adding this duration to the next count of the S or P counter, respectively (i.e., initializing the S or P counter, respectively to this combined count). The assumption being made is that any S/P or P/S pair that produces no candidates is not a true S/P or P/S pair but is rather a signal-level transition caused by noise. Such changes and modifications can be made without departing from the spirit and the scope of the invention and without diminishing its attendant advantages. It is therefore intended that such changes and modifications be covered by the following claims.

The invention claimed is:

1. An apparatus for recognizing cadenced signals, comprising:

means for receiving a signal comprising a cadence of signal-on intervals interleaved with signal-off intervals;

means for measuring durations of sequential ones of the signal-on intervals and for measuring durations of sequential ones of the signal-off intervals;

a sequence of a plurality of first tables each corresponding to a different signal-on interval in the cadence and having a plurality of entries each corresponding to a different duration of the corresponding signal-on interval and identifying signals which have the corresponding signal-on interval duration as candidates for the received signal;

a sequence of a plurality of a second tables each corresponding to a different signal-off interval in the cadence and having a plurality of entries each corresponding to a different duration of the corresponding signal-off interval and identifying signals which have the corresponding signal-off interval duration as candidates for the received signal;

means for using sequential measured signal-on interval durations to select the corresponding entries from sequential ones of the first tables and using sequential measured signal-off interval durations to select the corresponding entries from sequential ones of the second tables;

means for comparing together the entries selected from the first and the second tables to determine a single signal that is identified by each of the selected entries as a candidate for the received signal; and means for indicating the received signal to be the determined candidate.

2. The apparatus of claim 1 wherein:

said cadence comprises a sequence of at least one interval-pair each comprising one of the signal-on intervals and an adjacent one of the signal-off intervals;

the first and the second tables form a sequence of a plurality of table-pairs each corresponding to a different interval-pair of the cadence and comprising the first table corresponding to the signal-on interval of the corresponding interval-pair and the second table corresponding to the signal-off interval of the corresponding interval-pair;

the using means comprise means for using the measured durations of the intervals in sequential interval-pairs to select a corresponding pair of entries, one entry of the pair from the first table and a second entry of the pair from the second table, of sequential ones of the table-pairs;

the comparing means comprise means responsive to an initial pair of entries selected by the using means for generating a candidate list identifying signals that are identified by both entries of the pair of selected entries, and responsive to each non-initial pair of entries selected by the using means for generating a candidate list identifying signals that are identified by both entries of the pair of selected entries and a candidate list generated in response to an immediately-preceding pair of entries selected by the using means; and the indicating means comprise means responsive to a candidate list identifying only one signal as a candidate, for indicating the received signal to be the one candidate signal.

3. The apparatus of claim 1 wherein:

the signal comprises a repeating said cadence, said cadence comprising a sequence of at least one interval-pair each comprising one of the signal-on intervals and an adjacent one of the signal-off intervals, said cadence beginning with a first interval-pair; and the using means use measured interval durations of the first interval-pair and subsequent interval-pairs of the cadence; and the comparing means compare entries selected by the using means by use of measured interval durations of only the first interval-pair and subsequent interval-pairs of the cadence.

4. The apparatus of claim 3 wherein:

the apparatus further comprises means for identifying the first interval-pair in the received signal.

5. An apparatus for recognizing a beginning of a cadence of a signal, comprising:

means for receiving a signal comprising a repeating cadence of signal-on intervals interleaved with signal-off intervals, said cadence comprising a sequence of at least one interval-pair each comprising one of the signal-on intervals and an adjacent one of the signal-off intervals;

means for measuring durations of sequential ones of the signal-on intervals and for measuring durations of sequential ones of the signal-off intervals;

a sequence of a plurality of table-pairs each corresponding to a different interval-pair of the cadence and comprising a first table having a plurality of entries each corresponding to a different duration of the signal-on interval of the corresponding interval-pair and identifying recognizable signals which have the corresponding signal-on interval duration as candidates for the received signal, and a second table having a plurality of entries each corresponding to a different duration of the signal-off interval of the corresponding interval-pair and identifying recognizable signals which have the corresponding signal-on interval duration as candidates for the received signal;

a plurality of selecting means each for using measured durations of the intervals in sequential interval-pairs to select a corresponding pair of entries, one entry of the pair from the first table and a second entry of the pair from the second table, of sequential ones of the table-pairs, each selecting means using a different interval-pair from the interval-pairs used by the other selecting means to select the pair of entries from each table-pair;

a plurality of candidate-list-generating means each corresponding to a different one of the selecting means and responsive to an initial pair of entries selected by the corresponding selecting means for generating a candidate list identifying signals that are identified by both entries of the pair of selected entries, and responsive to each non-initial pair of entries selected by the corresponding selecting means for generating a candidate list identifying signals that are identified by both entries of the pair of selected entries and a candidate list generated by same said candidate-list-generating means responsive to an immediately—preceding pair of entries selected by the corresponding selecting means;

a plurality of count tables each corresponding to a different one of the selecting means and having, for each recognizable signal, a count of a number of sequential interval-pairs needed to uniquely identify the corresponding signal among all of the recognizable signals;

a plurality of count-decrementing means each corresponding to a different one of the selecting means and responsive to each candidate list generated by the corresponding selecting means' corresponding candidate-list generating means, for decrementing in the corresponding selecting means' corresponding count table the counts corresponding to the signals identified in the candidate list; and a plurality of cadence-commencement-indicating means each corresponding to a different one of the selecting means and responsive to a candidate list generated by the corresponding selecting means' candidate-list-generating means identifying only one signal as a candidate and the one signal's corresponding count in the corresponding selecting means' corresponding count table indicating that exactly the number of sequential interval-pairs needed to uniquely identify the corresponding signal has been used to decrement the count, for indicating that a beginning of the cadence of the received signal has been reached.

6. The apparatus of claim 5 further comprising:
means for uniquely identifying the received signal from among a plurality of recognizable signals.

7. The apparatus of claim 5 further comprising:
means responsive to the indication that the beginning of the cadence of the received signal has been reached, for uniquely identifying the received signal by its cadence from among a plurality of recognizable signals each comprising a different cadence.

8. An apparatus for recognizing cadenced signals comprising:
means for receiving a signal comprising a repeating cadence of signal-on intervals interleaved with signal-off intervals, said cadence comprising a sequence of at least one interval-pair each comprising one of the signal-on intervals and an adjacent one of the signal-off intervals;

means for measuring durations of sequential ones of the signal-on intervals and for measuring durations of sequential ones of the signal-off intervals;

a sequence of a plurality of table-pairs each corresponding to a different interval-pair of the cadence and comprising a first table having a plurality of entries each corresponding to a different duration of the signal-on interval of the corresponding interval-pair and identifying recognizable signals which have the corresponding signal-on interval duration as candidates for the received signal, and a second table having a plurality of entries each corresponding to a different duration of the signal-off interval of the corresponding interval-pair and identifying recognizable signals which have the corresponding signal-on interval duration as candidates for the received signal;

a plurality of selecting means each for using measured durations of the intervals in sequential interval-pairs to select a corresponding pair of entries, one entry of the pair from the first table and a second entry of the pair from the second table, of sequential ones of the table-pairs, each selecting means using a different interval-pair from the interval pairs used by the other selecting means to select the pair of entries from each table-pair;

a plurality of candidate-list-generating means each corresponding to a different one of the selecting means and responsive to an initial pair of entries selected by the corresponding selecting means for generating a candidate list identifying signals that are identified by both entries of the pair of selected entries, and responsive to each non-initial pair of entries selected by the corresponding selecting means for generating a candidate list identifying signals that are identified by both entries of the pair of selected entries and a candidate list generated by same said candidate-list-generating means responsive to an immediately—preceding pair of entried selected by the corresponding selecting means;

a plurality of count tables each corresponding to a different one of the selecting means and having, for each recognizable signal, a count of a number of sequential interval-pairs needed to uniquely identify the corresponding signal among all of the recognizable signals;

a plurality of count-decrementing means each corresponding to a different one of the selecting means and responsive to each candidate list generated by the corresponding selecting means, corresponding candidate-list generating means, for decrementing in the corresponding selecting means' corresponding count table the counts corresponding to the signals identified in the candidate list; and a plurality of cadence-commencement-indicating means each corresponding to a different one of the selecting means and responsive to a candidate list generated by the corresponding selecting means' candidate-list-generating means identifying only one signal as a candidate and the one signal's corresponding count in the corresponding selecting means' corresponding count table indicating that exactly the number of sequential interval-pairs needed to uniquely identify the corresponding signal has been used to decrement the count, for indicating that a beginning of the cadence of the received signal has been reached; wherein an individual one of the selecting means is responsive to the indication that a beginning of the cadence of the received signal has been reached, by using the measured durations of the intervals in sequential interval-pairs commencing with the first interval-pair to select the corresponding pair of entries of sequential ones of the table-pairs commencing with the table-pair corresponding to the first interval-pair;

the one of the candidate-list-generating means corresponding to the individual selecting means is responsive to the indication that a beginning of the cadence of the received signal has been reached and to the pair of entries selected by the individual selecting means by using the measured durations of the intervals in the first interval-pair, for generating a candidate list identifying signals that are identified by both entries of the pair of selected entries, and is responsive to each pair of entries selected by the individual selecting means by using the measured duration of the intervals in interval-pairs subsequent to the first interval-pair, for generating a candidate list identifying signals that are identified by both entries of the pair of selected entries and the candidate list generated by said same candidate-list-generating means responsive to the immediately-preceding pair of entries selected by the individual selecting means; and the apparatus further comprising
  means responsive to the indication that a beginning of the cadence of the received signal has been reached, for determining a candidate list generated by the one candidate-list-generating means that identifies only one signal as a candidate, and indicating the received signal to be said only one signal.

9. A method for recognizing cadenced signals, comprising the steps of:

in response to receiving a signal comprising a cadence of signal-on intervals interleaved with signal-off intervals, measuring durations of sequential ones of the signal-on intervals and measuring durations of sequential ones of the signal-off intervals;

using sequential measured signal-on interval durations in a sequence of a plurality of first tables each corresponding to a different signal-on interval in the cadence and having a plurality of entries, each entry corresponding to a different duration of the corresponding signal-on interval and identifying signals which have the corresponding signal-on interval duration as candidates for the received signal, to select the corresponding entries from sequential ones of the first tables;

using sequential measured signal-off interval durations in a sequence of a plurality of a second tables each corresponding to a different signal-off interval in the cadence and having a plurality of entries, each entry corresponding to a different duration of the corresponding signal-off interval and identifying signals which have the corresponding signal-off interval duration as candidates for the received signal, to select the corresponding entries from sequential ones of the second tables;

comparing together the entries selected from the first and the second tables to determine a single signal that is identified by each of the selected entries as a candidate for the received signal; and indicating the received signal to be the determined candidate.

10. The method of claim 9 wherein:

said cadence comprises a sequence of at least one interval-pair each comprising one of the signal-on intervals and an adjacent one of the signal-off intervals;

the first and the second tables form a sequence of a plurality of table-pairs each corresponding to a different interval-pair of the cadence and comprising the first table corresponding to the signal-on interval of the corresponding interval-pair and the second table corresponding to the signal-off interval of the corresponding interval-pair;

the steps of using together comprise the step of
  using the measured durations of the intervals in sequential interval-pairs to select a corresponding pair of entries, one entry of the pair from the first table and a second entry of the pair from the second table, of sequential ones of the table-pairs;

the step of comparing comprises the steps of
  in response to an initial selected pair of entries, generating a candidate list identifying signals that are identified by both entries of the pair of selected entries, and
  in response to each non-initial selected pair of entries, generating a candidate list identifying signals that are identified by both entries of the pair of selected entries and a candidate list generated in response to a sequentially immediately-preceding selected pair of entries; and the step of indicating comprises the step of
  in response to a candidate list identifying only one signal as a candidate, indicating the received signal to be the one candidate signal.

11. The method of claim 9 wherein:

the signal comprises a repeating said cadence, said cadence comprising a sequence of at least one interval-pair each comprising one of the signal-on intervals and an adjacent one of the signal-off intervals, said cadence beginning with a first interval-pair; and the steps of using use the measured interval durations of the first interval-pair and subsequent interval-pairs of the cadence; and the step of comparing compares entries selected by use of measured interval durations of only the first interval-pair and subsequent interval-pairs of the cadence.

12. The method of claim 11 wherein:

the method comprises, as its first step, the step of
  in response to receiving the signal, identifying the first interval-pair in the received signal.

13. A method for recognizing a beginning of a cadence of a signal, comprising the steps of:

in response to receiving a signal comprising a repeating cadence of signal-on intervals interleaved with signal-off intervals, said cadence comprising a sequence of at least one interval-pair each comprising one of the signal-on intervals and an adjacent one of the signal-off intervals, measuring durations of sequential ones of the signal-on intervals and measuring durations of sequential ones of the signal-off intervals;

using measured durations of the intervals of sequential interval-pairs in each one of a sequence of a plurality of table-pairs each corresponding to a different interval-pair of the cadence, each table-pair comprising a first table having a plurality of entries each corresponding to a different duration of the signal-on interval of the corresponding interval-pair and identifying recognizable signals which have the corresponding signal-on interval duration as candidates for the received signal and a second table having a plurality of entries each corresponding to a different duration of the signal-off interval of the corresponding interval-pair and identifying recognizable signals which have the corresponding signal-on interval duration as candidates for the received signal, to select a corresponding pair of entries, one entry of the pair from the first table and a second entry of the pair from the second table, of each table-pair;

in response to initial pairs of entries one selected from each table-pair, generating candidate lists each identifying signals that are identified by both entries of corresponding said initial pair of selected entries;

in response to each non-initial pair of entries selected from each table-pair, generating candidate lists each identifying signals that are identified by both entries of corresponding said non-initial pair of selected entries and a candidate list generated in response to a pair of entries selected from a sequentially immediately-preceding table-pair by a sequentially immediately-preceding pair of selected entries;

in response to each individual generated candidate list, accessing one of a plurality of count tables each corresponding to a different one of the initial pairs of entries and having, for each recognizable signal, a count of a number of sequential interval-pairs needed to uniquely identify the corresponding signal among all of the recognizable signals, the accessed one count table corresponding to the initial pair of entries that was involved in generating the individual candidate list, and decrementing in the accessed count table the counts corresponding to the signals identified in the individual generated candidate list; and in response to any candidate list identifying only one signal as a candidate and the one signal's corresponding count in the count table that corresponds to the initial pair of entries that was involved in generating said any candidate list indicating that exactly the number of sequential interval-pairs needed to uniquely identify the corresponding signal has been used to decrement the count, indicating that a beginning of the cadence of the received signal has been reached.

14. The method of claim 13 further comprising the additional step of:

uniquely identifying the received signal from among a plurality of recognizable signals.

15. The method of claim 13 further comprising the step of:

in response to the indicating that the beginning of the cadence of the received signal has been reached, uniquely identifying the received signal by its cadence from among a plurality of recognizable signals each comprising a different cadence.

16. A method for recognizing cadenced signals comprising the steps of:

in response to receiving a signal comprising a repeating cadence of signal-on intervals interleaved with signal-off intervals, said cadence comprising a sequence of at least one interval-pair each comprising one of the signal-on intervals and an adjacent one of the signal-off intervals, measuring durations of sequential ones of the signal-on intervals and measuring durations of sequential ones of the signal-off intervals;

using measured durations of the intervals of sequential interval-pairs in each one of a sequence of a plurality of table-pairs each corresponding to a different interval-pair of the cadence, each table-pair comprising a first table having a plurality of entries each corresponding to a different duration of the signal-on interval of the corresponding interval-pair and identifying recognizable signals which have the corresponding signal-on interval duration as candidates for the received signal and a second table having a plurality of entries each corresponding to a different duration of the signal-off interval of the corresponding interval-pair and identifying recognizable signals which have the corresponding signal-on interval duration as candidates for the received signal, to select a corresponding pair of entries, one entry of the pair from the first table and a second entry of the pair from the second table, of each table-pair;

in response to initial pairs of entries one selected from each table-pair, generating candidate lists each identifying signals that are identified by both entries of corresponding said initial pair of selected entries;

in response to each non-initial pair of entries selected from each table-pair, generating candidate lists each identifying signals that are identified by both entries of corresponding said non-initial pair of selected entries and a candidate list generated in response to a pair of entries selected from a sequentially immediately-preceding table-pair by a sequentially immediately-preceding pair of selected entries;

in response to each individual generated candidate list, accessing one of a plurality of count tables each corresponding to a different one of the initial pairs of entries and having, for each recognizable signal, a count of a number of sequential interval-pairs needed to uniquely identify the corresponding signal among all of the recognizable signals, the accessed one count table corresponding to the initial pair of entries that was involved in generating the individual candidate list, and decrementing in the accessed count table the counts corresponding to the signals identified in the individual generated candidate list; and in response to any candidate list identifying only one signal as a candidate and the one signal's corresponding count in the count table that corresponds to the initial pair of entries that was involved in generating said any candidate list indicating that exactly the number of sequential interval-pairs needed to uniquely identify the corresponding signal has been used to decrement the count, indicating that a beginning of the cadence of the received signal has been reached;

in response to the indicating that a beginning of the cadence of the received signal has been reached, using the measured durations of the intervals in sequential interval-pairs commencing with the first interval-pair to select the corresponding pair of entries of sequential ones of the table-pairs commencing with the table-pair corresponding to the first interval-pair;

in response to the pair of entries selected by using the measured durations of the intervals in the first interval-pair, generating a candidate list identifying signals that are identified by both entries of the pair of selected entries;

in response to each pair of entries selected by using the measured duration of the intervals in interval-pairs subsequent to the first interval-pair, generating a candidate list identifying signals that are identified by both entries of the pair of selected entries and the candidate list generated responsive to the sequentially immediately-preceding pair of selected entries; and in response to a candidate list, generated in response to a pair of entries selected by using the measured duration of the intervals in the first interval-pair or one of said subsequent interval-pairs, identifying only one signal as a candidate, indicating the received signal to be said only one signal.

* * * * *